United States Patent [19]

Debus et al.

[11] Patent Number: 4,689,722

[45] Date of Patent: Aug. 25, 1987

[54] SWITCH CABINET WITH MOUNTING BOARD

[75] Inventors: Juergen Debus; Hans-Georg Koch, both of Dietzholztal; Juergen Zachrei, Dillenburg; Helmut Buetergerds, Eschenburg, all of Fed. Rep. of Germany

[73] Assignee: Rittal-Werk Rudolf Loh GmbH & Co. KG, Fed. Rep. of Germany

[21] Appl. No.: 745,286

[22] Filed: Jun. 14, 1985

[30] Foreign Application Priority Data

Jun. 16, 1984 [DE] Fed. Rep. of Germany ... 8418270[U]

[51] Int. Cl.⁴ .............................................. H05K 5/04
[52] U.S. Cl. .................................... 361/391; 361/429
[58] Field of Search ......... 211/41; 339/17 LM, 17 M, 339/65, 186 M; 361/390–391, 415, 428, 429

[56] References Cited

U.S. PATENT DOCUMENTS

| 3,191,097 | 6/1965 | Dano et al. | 361/391 |
| 3,333,156 | 7/1967 | Weisman | 361/415 |
| 3,848,953 | 11/1974 | Petroshanoff | 361/391 |

FOREIGN PATENT DOCUMENTS 0653734 12/1962 Canada ........................... 339/186 M Primary Examiner—A. D. Pellinen
Assistant Examiner—Gregory D. Thompson
Attorney, Agent, or Firm—Thomas W. Speckman; Ann W. Speckman

[57] ABSTRACT

A switch cabinet with a mounting board wherein two guide rails extend parallel to the lower side members of the switch cabinet and the mounting board has guide blocks fitted to its lower edge mating with the guide rails. The mounting blocks have a recess in their bottom surface fitting over upwardly extending pegs fitted in the frame unit of the switch cabinet to secure the lower edge of the mounting board. Securement brackets are provided in the upper portion of the frame unit to securely fasten the upper edge of the mounting board when it is in position. The structure of this invention provides simpified installation of the mounting board within the switch cabinet providing positive guidance and securement of the lower edge of the mounting board as soon as it is properly inserted.

25 Claims, 4 Drawing Figures

SWITCH CABINET WITH MOUNTING BOARD

BACKGROUND OF THE INVENTION

1. Field of the Invention

This invention relates to a switch cabinet formed by a frame unit, comprising frame members assembled together with wall elements and a cabinet door which can be closed, as well as a mounting board which can be fastened to the frame unit parallel to a rear panel.

2. Description of the Prior Art

The purpose of the mounting board is to allow components to be mounted in the cabinet and it is generally provided with a grid of openings for this purpose, as shown in German Patent Publication DE-OS No. 23 47 284. Since this type of mounting board is very heavy, its insertion into the cabinet occasions considerable difficulties, especially since its lower edge must be precisely fitted in a retaining rail or similar arrangement provided inside the cabinet. For this reason, various ways of supporting the mounting board have been proposed, whereby the board is lowered into the cabinet and whereby its lower edge, which abuts the retaining rail or similar arrangement, is set into the cabinet, as shown in DE-GM No. 83 10 727. However, even in this arrangement, fitting is not easy and it still requires the mounting board to be inserted manually to a retaining rail or similar securing arrangement.

SUMMARY OF THE INVENTION

A purpose of this invention is to provide a design for switch cabinets of the type referred to above, in which installation of the mounting board is considerably simplified, and in particular, positive guidance is continuously provided as the mounting board is inserted in the cabinet; at the same time, the lower edge of the mounting board is automatically secured as soon as it is properly inserted.

This objective is met according to this invention by providing a frame unit with at least two guide rails extending parallel to its two lower frame members, which rails are provided with an upper guide bar, whereby plastic guide blocks may be mounted on the lower edge of the mounting board at intervals corresponding to the distance between the guide rails; these guide blocks are provided with guide grooves in which the corresponding guide bars of the guide rails are engageable; the plastic guide blocks are also provided with recesses directed parallel to the plane of the mounting board, with openings facing downwardly; pegs are arranged facing upwardly at the rear of the frame unit to match the recesses in the plastic guide blocks; the pegs fit within the recesses to secure the lower edge of the mounting board; and securing brackets are attached to the frame unit to secure the mounting board at its upper edge.

During insertion of a mounting board into a cabinet provided with guide rails, the mounting board may be positioned on the guide rails so that, as the mounting board is installed, the recesses are properly aligned with respect to the pegs installed on the frame unit itself. While the mounting board is being inserted, it is preferable to provide a means of limiting the movement of the board, which is inclined at an angle with respect to the guide rails, so that as the mounting board is straigtened into a vertical plane, the recesses in the guide blocks provide a secure fit with the pegs. The upper edge of the mounting board then has only to be secured to the frame unit.

In one embodiment of this invention, the guide bars of the guide rails are flush with the upper surfaces of the lower horizontal frame members of the frame unit, so that the guide bars themselves do not interfere with the useful area inside the switch cabinet.

Another embodiment provides improved guidance of the mounting board, which is inserted into a cabinet at an angle, in that the plastic guide blocks mounted at the lower and forward edges of the mounting board protrude from the plane of the mounting board, and guide grooves aligned perpendicular to the plane of the mounting board are provided in the area of the lower front edge of the plastic guide blocks, whereby the guide grooves are tapered with respect to the mounting board. This embodiment has performed very well utilizing only two plastic guide blocks located at the lower corners of the mounting board and fitted flush with lateral side walls extending at a right angle from the vertical edges of the mounting board.

Guide blocks may be mounted on the mounting board so that the slot in the upper part of the blocks is aligned parallel to the board itself. The slot corresponds to and accommodates a peg fitting which may be inserted and retained behind the surface of the mounting board through an opening in a side wall which is provided at a right angle to the lower edge of the mounting board. This peg fitting retains the plastic guide block on the mounting board. In this way, a simple press fit is sufficient to insure positive retention of a guide block on the board.

Recesses, which may take the form of blind bores aligned with the pegs, mounted on the frame unit are located in the lower sides of the plastic guide blocks to allow the mounting board to be mounted as closely as possible to the rear panel of the switch cabinet.

Placement of the recesses over the pegs as the mounting board is aligned vertically, may be facilitated by providing the pegs with a tapered hemispherical shape at their upper terminal ends. In one embodiment of the invention, the lower ends of the pegs may be threaded and engage in a threaded insert in the frame unit or may be fastened to the guide rails.

Inserts may be mounted in the frame unit when frame members of the frame unit comprise hollow sections with an interior cross section that is roughly square, at least a portion of the walls of these hollow sections are provided with rows of holes, and threaded inserts are positioned inside the lower horizontal frame members which are movable and maybe screwed to the frame members. It is sufficient in this arrangement for the upper horizontal and inner vertical walls of the hollow section frame members to be provided with flush rows of holes.

If an embodiment is desired to provide the mounting board installed at a greater distance from the rear panel of the switch cabinet, the guide bars of the guide rails may be provided with rows of holes and the pegs may be fastened to links which are attached in turn to the guide rails or to lower side members parallel to the guide rails.

The guide bars of the guide rails may provide a further function as well, when threaded inserts are mounted in holes provided in the guide bars of the guide rails. Clamping screws may then be fitted in these inserts, be means of which lower panels may be retained to the frame unit.

In one embodiment of this invention, the mounting board may be fastened to the frame unit by configuring the free ends of the angled side edges or the upper edge of the mounting board as a right-angled fastening flange, whereby securing brackets may be screwed to the outside of this flange with a fastening member and the securing brackets may also be fixed by means of other fastening members to the upper lateral horizontal frame members or to the upper, rear horizontal frame member of the frame unit.

A further embodiment of this invention provides that the securing brackets overlap the top edge of the mounting board, so that fastening members, which can be attached to the upper horizontal frame members of the frame unit, may be arranged in front of the mounting board. This arrangement allows the mounting board to be located inside the frame formed by the four rear frame members of the frame unit itself.

In a further embodiment, in order to prevent the fastening screws mounted between securing brackets and the mounting board from encroaching on the component mounting area, the fastening members of securing brackets facing fastening flanges of the mounting board may be provided with countersunk threaded bores to accommodate the heads of the screw fastenings; the fastening flanges may be provided with connecting bores for the passage of the screw fastenings; and the mounting board may be provided with countersunk pilot bores for the heads of the screw fastenings.

The frame unit and the securing brackets may be fastened using only a few screws when the bracket fastening members facing the upper horizontal frame members of the frame unit are fitted with a detent which may be inserted through a hole in the frame member, and the fastening member is screwed to a fixed threaded bore inside the frame member. Thus, each bracket can be firmly fastened to the frame unit with just a single screw.

BRIEF DESCRIPTION OF THE DRAWING

The invention will now be described in greater detail with the aid of embodiments illustrated in the drawings, in which.

DESCRIPTION OF PREFERRED EMBODIMENTS

Figure 1:
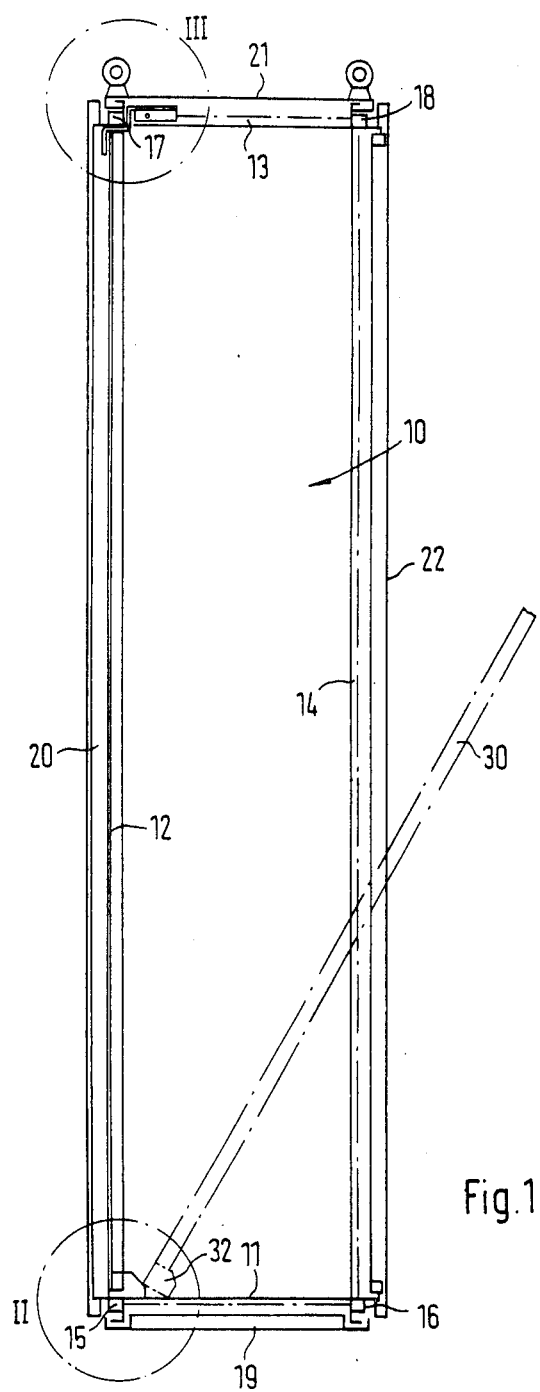
FIG. 1 is a schematic side view showing the general design of the switch cabinet and the mounting board in its insertion position, illustrating particularly the placement of the mounting board.

The schematic side view of FIG. 1 shows the general arrangement of frame unit 10 formed by its several frame members. In the lower part of the assembly, front and rear horizontal frame members 16 and 15, respectively, together with lateral horizontal frame members 11, of which only one frame member 11 is visible, form the lower horizontal frame assembly. Four vertical frame members extend upwardly from the four corners of the frame unit, front and rear frame members 14, and 12, respectively, on one side of the frame unit being shown. At the top of the assembly, front and rear frame members 18 and 17, respectively, together with upper side frame members 13, only one of which is visible, form the upper horizontal frame assembly, which is attached to the four vertical frame members. The frame unit is enclosed by bottom panel 19, rear panel 20, top panel 21 and door panel 22, as well as by side panels between the two sets of vertical frame members.

Thus, frame unit 10 comprises twelve frame members of uniform cross section. The interior cross section of the frame members, preferably comprising hollow sections, is roughly square. Two adjacent walls of frame members which form right angles are provided with complementary flanges. One of these flanges is straight, whereas the other is L-shaped. Each frame member which is extended by a flange is provided with a row of holes 24, (FIG. 2) which are of rectangular or square cross section in the embodiment illustrated, and are arranged at uniform distances from each other. As shown in FIG. 1, mounting board 30 is inserted into the switch cabinet at an angle, whereby the board is supported on the guide bars 50 of guide rails 37, as will be described below.

Figure 2:
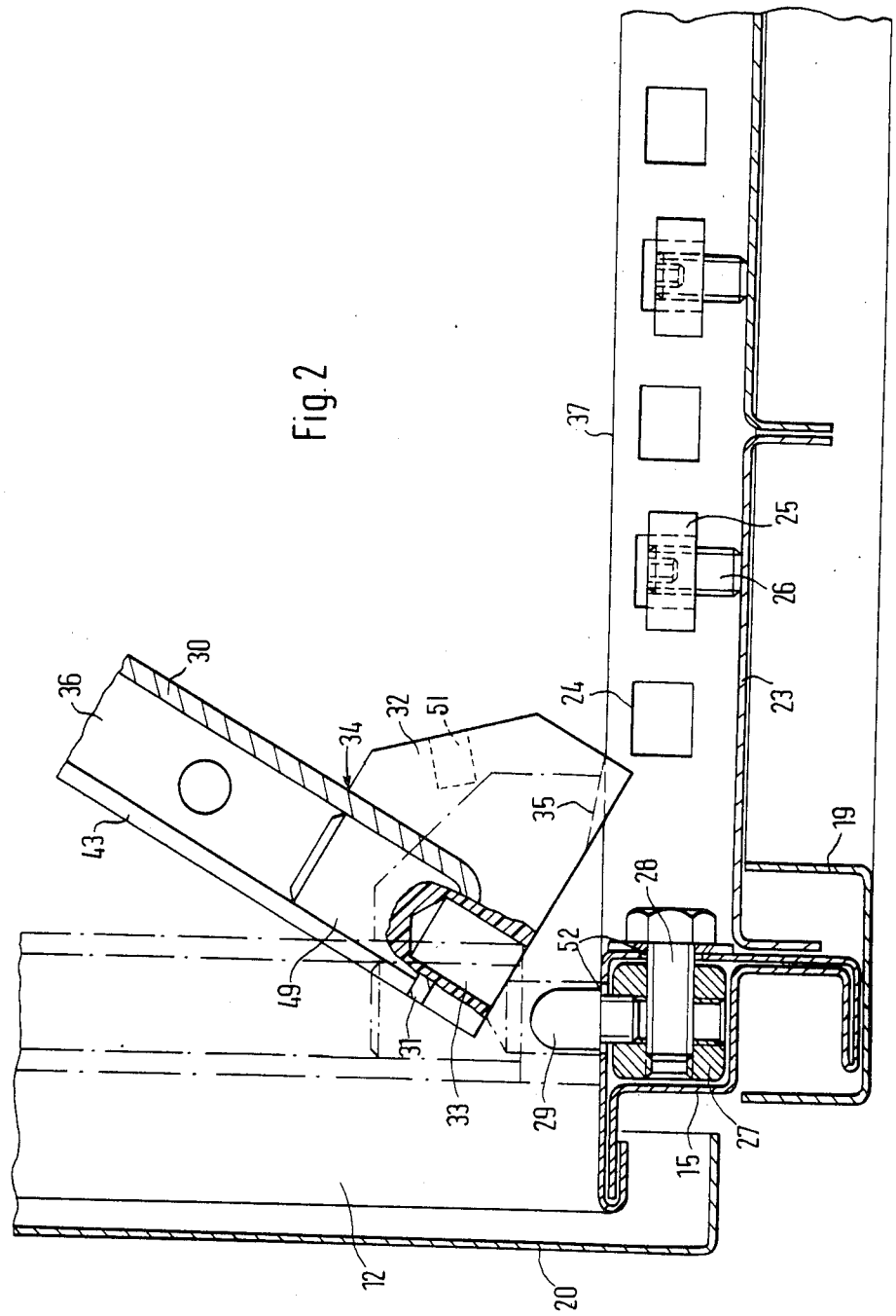
FIG. 2 shows an enlarged view, partially in cross section, of the area designated as II in FIG. 1.
Figure 4:
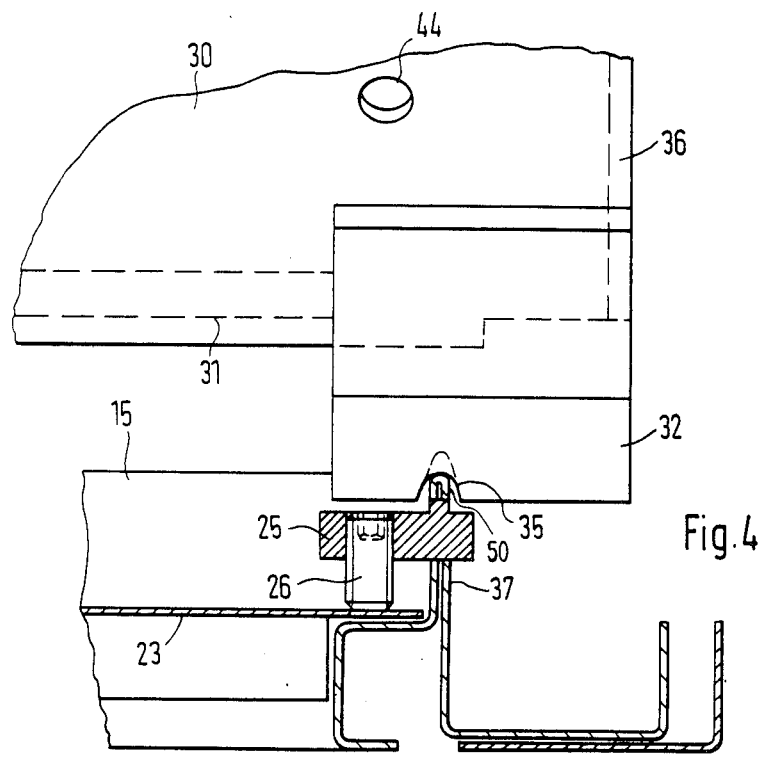
FIG. 4 shows a partial front view, partially in cross section, of the assembly with a mounting board fitted on a guide rail.

As shown in FIG. 2, plastic guide blocks 32 are provided at the lower edge of mounting board 30 and these guide blocks are provided with guide grooves 35 perpendicular to the plane of mounting board 30. As shown in FIG. 4, plastic guide blocks 32 are fitted at the ends of the lower edge of mounting board 30 and are flush with side walls 36 extending from the vertical edges of mounting board 30 and at a right angle to the mounting board itself. Plastic guide blocks 32 are provided with a slot 34 in their upper sides extending parallel to the plane of mounting board 30 and defining peg fitting 49. At the lower edge of mounting board 30, recesses are arranged near the corners of side piece 31 which is angled to allow plastic guide blocks 32 to be inserted at the lower edge of mounting board 30. In this way, peg fitting 49 engages mounting board 30 from the rear to securely retain guide block 32. This push-fit is sufficient to insure that plastic guide blocks 32 are tightly secured to mounting board 30.

Guide blocks 32 extend from the lower and front edges of mounting board 30. Guide grooves 35 are provided near the front lower edge of plastic guide blocks 32, so that the bottom of the groove is always at a slight angle to mounting board 30. This arrangement insures that when mounting board 30 is inserted into the cabinet at an angle, sufficient supporting area and positive guidance are provided at the guide bars 50 of two guide rails 37. Guide rails 37 are arranged between the two lateral horizontal frame members 11 and are thus attached to the front and rear horizontal frame members 16 and 15 in such a way that the upper surfaces of the guide bars 50 are flush with these frame members. The distance between guide bars 50 of guide rails 37 corresponds to the distance between a guide grooves 35 of two plastic guide blocks 32 fastened to mounting board 30.

Fitted recesses 33 are arranged in the form of blind bores in the area of peg fittings 49 of plastic guide blocks 32; these recesses are aligned parallel to the plane of mounting board 30 and open toward the bottom.

In this embodiment, two fitted pegs 29 are provided in rear lower horizontal frame member 15; the distance between these pegs matches the distance between recess 33 in guide blocks 32. The upper terminal ends of pegs 29 may be hemispherical in shape and project above the upper part of the guide bars 50 of guide rails 37. Fitted pegs 29 may be provided with a narrow threaded section which passes through a hole 24 in the upper horizontal wall of frame member 15 and may be screwed into threaded insert 27. This insert is adjustable within frame member 15, in which it is fastened by a screw which passes through a hole 24 in the inner vertical wall of frame member 15, and pegs 29 may be screwed into threaded insert 27. Insert 27 is therefore provided with two threaded recesses 52 at right angles to one another. The spacings of the holes 24 in frame member 15 determine the points at which the distance between fitted pegs 29 can be altered. The extent of movement of mounting board 30 when it is inserted at an angle along guide rails 37 can be limited by stops or some similar arrangement, or by the fitted pegs themselves, so that when mounting board 30 is vertically upright, recesses 33 fit over and onto pegs 29. In this embodiment, the hemispherical configuration of the upper terminal ends of the pegs plays an important part. The lower edge of upright mounting board 30 is then immediately secured, as shown by the dotted lines in FIG. 2. In this embodiment, mounting board 30 is positioned within the rear vertical members of frame unit 10, of which frame members 12, 15 and 17 are visible if FIG. 1.

Mounting board 30 may also be positioned at a greater distance from rear panel 20, if desired. In this case, the pegs may be mounted on extension links, which are fastened to guide rails 37 or to lower horizontal side frame members 11. In this arrangement, care must be taken to insure that fitted pegs 29 are at a proper distance from one another and that the movement of the mounting board is suitably limited during insertion. For this reason a row of holes 24 is also provided in guide rails 37, preferably at the same intervals and of the same shape as those located in the frame members of frame unit 10.

FIGS. 2 and 4 show that threaded inserts 25 may also be placed inside holes 24 in guide rails 37, which may accommodate a clamping screw 26 whereby lower panel 23 may be firmly retained against guide rails 37, frame unit 10 or bottom panel 19 by clamping screws 26.

Figure 3:
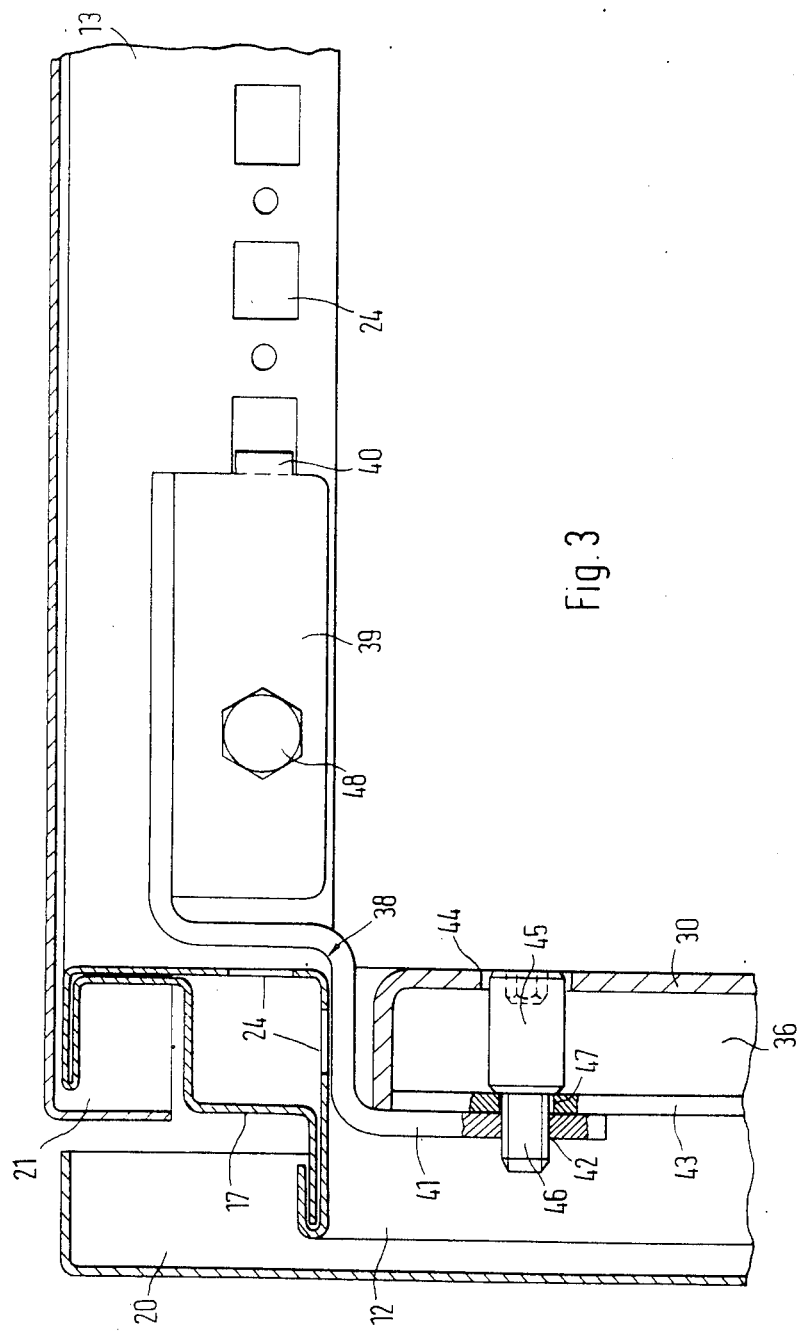
FIG. 3 shows an enlarged view, partially in cross section, of the area designated as III in FIG. 1.

When mounting board 30 has been installed in its vertical position and its lower edge is secured on fitted pegs 29, the upper edge of mounting board 30 need only be fastened to frame unit 10. FIG. 3 shows one such fastening arrangement with a securing bracket 38 which provides a suitable means of retaining mounting board 30 inside the rear vertical framework of frame unit 10. Free edges 36 of mounting board 30 are at right angles to provide a fastening flange 43.

Fastening member 41 of securing bracket 38 is arranged outside fastening flange 43 and threaded bore 42 is located therein. Fastening screw 46 has a head of larger diameter 45 which is passed through bore 44 in mounting board 30 and is supported by fastening flange 43 in the area of communicating bore 47. In this way, fastening screw 46 does not present an obstacle to the fitting of components on mounting board 30.

Securing bracket 38 overlaps the upper edge of mounting board 30 and, depending on the embodiment concerned, may be fastened either to top rear horizontal frame member 17, or to one of the upper side frame members 13, as required. In the former case, securing bracket 38 may be Z-shaped and its free end may be directly screwed to frame member 17, whereby threaded inserts 27 may be employed. Securing brackets 38 are preferably fitted and fastened to each of the two ends of the upper edge of mounting board 30.

In the embodiment shown in FIG. 3, L-shaped fastening member 39 is secured to the side frame member 13 and connects with the second end member of the Z-shaped securing bracket 38.

Screw 48 may be passed through a hole in frame member 13 and screwed into an insert located inside the frame member itself. The insert may also be secured to frame member 13 by means of a further screw. Fastening member 39 may have an angled detent 40 which engages in hole 24 in frame member 13 to retain fastening member 39 and prevent it from rotating with respect to frame member 13, despite the use of a screw fastening.

The intervals between the holes 24 also determine the points at which the distance between mounting board 30 and rear panel 20 of the switch cabinet can be altered.

In the area in front of mounting board 30, and preferably near the beveled leading upper edge of guide blocks 32, the guide blocks may be provided with recesses 51 to accommodate a rail, such as a cable harness support or a grounded lead. The rail will then be positively located with respect to mounting board 30, together with which it forms a movable entity.

We claim:

1. A switch cabinet comprising a rectangular frame unit (10) formed by a plurality of frame members (11, 12, 13, 14, 15, 16, 17, 18) fastened together, side wall panels, a rear panel (20), a top panel (21), a bottom panel (19), and a door panel (22) enclosing an interior space, and a movable mounting board (30) which is fastenable to said frame unit in a mounted position wherein said mounting board (30) is in a plane parallel to said rear panel (20), wherein said frame unit (10) is provided with at least two guide rails (37) extending parallel to two lower side frame members (11), and each said guide rail (37) is provided with at least one guide bar (50); at least two guide blocks (32), each said guide block (32) provided with a guide groove (35) engageable in said guide bar (50) of the corresponding said guide rail (37), are attached at the lower corners of said mounting board (30) at an interval corresponding to the distance between said guide rails (37), and said guide blocks (32) are provided with recesses (33) extending parallel to the plane of said mounting board (30) and opening downwardly; at least two vertically upwardly extending pegs (29) are fastened to the rear of said frame unit (10) or said guide rails (37) at an interval which corresponds to the distance between said recesses (33) in said guide blocks (32), said pegs (29) securely retainable in said recesses (33) to maintain a lower edge of said mounting board (30) in said mounted position; and at least two securing brackets (38) are fastened to an upper portion of said frame unit (10) to maintain the upper edge of said mounting board (30) in said mounted position.

2. A switch cabinet according to claim 1, wherein said guide bars (50) of said guide rails (37) are flush with the upper surfaces of lower said frame members (11, 15 and 16) of said frame unit (10).

3. A switch cabinet according to claim 2, wherein said guide blocks (32) overlap said lower corners of said mounting board (30) and said guide grooves (35) are provided in a lower front edge of said guide blocks (32) and are directed perpendicular to the plane of said mounting board (30).

4. A switch cabinet according to claim 3, wherein said guide blocks (32) are provided at said lower corners of said mounting board (30), said mounting board (30) has side walls (36) extending at a right angle to its vertical front edge, and said guide blocks (32) are flush with said side walls (36) of said mounting board (30).

5. A switch cabinet according to claim 4, wherein a slot (34) is provided in an upper part of each said guide block (32) extending parallel to said plane of said mounting board (30), said slot (34) defining a peg fitting (49) which is inserted behind said mounting board (30) through an opening in a side piece (31) provided at a right angle to said lower edge of said mounting board (30) to retain said guide blocks (32) on said mounting board (30).

6. A switch cabinet according to claim 5, wherein said recesses (33) are blind bores in the area of said peg fittings (49) in a lower surface of said guide blocks (32).

7. A switch cabinet according to claim 6, wherein said pegs (29) have an upper terminal end having a hemispherical shape.

8. A switch cabinet according to claim 7, wherein an insert (27) is fastened to said frame unit (10) and each said peg (29) is provided with a threaded lower end threadedly retained in said insert (27).

9. A switch cabinet according to claim 8, wherein said frame members (11, 12, 13, 14, 15, 16, 17, 18) of said frame unit (10) comprise hollow sections having a generally rectangular interior cross section, at least a portion of wall sections of at least one of said frame members is provided with a row of holes (24), and said inserts (27) fastened to said frame unit (10) are movable and are fastened to at least one of said frame members by screws (28).

10. A switch cabinet according to claim 9, wherein upper horizontal and inner vertical walls of said lower frame members (11, 15, and 16) are provided with rows of holes (24).

11. A switch cabinet according to claim 10, wherein said guide rails (37) are provided with rows of holes (24) and inserts (25) are fastened in said holes (24) in said guide rails (37) to accommodate clamping screws (26), whereby said clamping screws (26) retain a lower panel (23) to said guide rails (37).

12. A switch cabinet according to claim 11, wherein a fastening flange (43) is provided on an upper portion of said mounting board (30); said securing brackets (38) are screwed to said fastening flange (43) by a fastening member (41) of said securing brackets (38); and said securing brackets (38) are attached to fastening members (39) provided on said frame unit (10).

13. A switch cabinet according to claim 12, wherein said securing brackets (38) overlap an upper edge of said mounting board (30), and said fastening members (39) are attached to an upper said frame member (13) of said frame unit (10), and are arranged in front of said mounting board (30).

14. A switch cabinet according to claim 13, wherein said fastening members (41) of said securing brackets (38) connected to said fastening flanges (43) of said mounting board (30) are provided with threaded bores (42) for receiving connecting screws (46) with heads (45) and said fastening flanges (43) are provided with communicating bores (47) for receiving said connecting screws (46) and said mounting board (30) is provided with guide bores (44) for retaining said heads (45) of said connecting screws (46).

15. A switch cabinet according to claim 14, wherein said fastening members (39) of said securing brackets (38) fastened to said upper frame member (13) of said frame unit (10) are provided with a detent (40) which is inserted in one of said holes (24) in said upper frame member (13), and said fastening members (39) are attached by screws (48) to an insert (25) fastened in said holes (24) of said upper frame member (13).

16. A switch cabinet according to claim 15, wherein said guide blocks (32) have a beveled front upper edge and are provided with recesses 51 for the attachment of a rail in the area of said beveled front upper edge.

17. A switch cabinet according to claim 1, wherein said guide blocks (32) overlap said lower corners of said mounting board (30) and said guide grooves (35) are provided in a lower front edge of said guide blocks (32) and are directed perpendicular to the plane of said mounting board (30).

18. A switch cabinet according to claim 1, wherein said guide blocks (32) are provided at said lower corners of said mounting board (30), said mounting board (30) has side walls (36) extending at a right angle to its vertical front edge, and said guide blocks (32) are flush with said side walls (36) of said mounting board (30).

19. A switch cabinet according to claim 1, wherein said pegs (29) have an upper terminal end having a hemispherical shape.

20. A switch cabinet according to claim 1, wherein an insert (27) is fastened to said frame unit (10) and each said peg (29) is provided with a threaded lower end threadedly retained in said insert (27).

21. A switch cabinet according to claim 1, wherein said frame members (11, 12, 13, 14, 15, 16, 17, 18) of said frame unit (10) comprise hollow sections having a generally rectangular interior cross section, at least a portion of wall sections of at least one of said frame members is provided with a row of holes (24), and inserts (27) are adjustably fastened to at least one of said frame members by screws (28).

22. A switch cabinet according to claim 1, wherein said guide rails (37) are provided with rows of holes (24) and inserts (25) are fastened in said holes (24) in said guide rails (37) to accommodate clamping screws (26), whereby said clamping screws (26) retain a lower panel (23) to said guide rails (37).

23. A switch cabinet according to claim 1, wherein a fastening flange (43) is provided on an upper portion of said mounting board (30); said securing brackets (38) are screwed to said fastening flange (43) by a fastening member (41) of said securing brackets (38); and said securing brackets (38) are attached to fastening members (39) provided on said frame unit (10).

24. A switch cabinet according to claim 1, wherein said securing brackets (38) are attached to fastening members (39) fastened to an upper said frame member (13) of said frame unit (10), said upper frame member 10 provided with rows of holes (24), said fastening members (39) are provided with a detent (40) which is inserted in one of said holes (24) in said upper frame member (13), and said fastening members (39) are attached by screws (48) to an insert (25) fastened in one of said holes (24) of said upper frame member (13).

25. A switch cabinet according to claim 1, wherein said guide blocks (32) have a beveled front upper edge and are provided with recesses 51 for the attachment of a rail in the area of said beveled front upper edge.

* * * * *